United States Patent [19]

Dillard

[11] 4,075,703
[45] Feb. 21, 1978

[54] RECURSIVE FILTER MEAN-LEVEL DETECTOR

[75] Inventor: George M. Dillard, San Diego, Calif.

[73] Assignee: The United States of America as represented by the Secretary of the Navy, Washington, D.C.

[21] Appl. No.: 737,877

[22] Filed: Nov. 1, 1976

[51] Int. Cl.$^2$ ............................................. G06F 15/34
[52] U.S. Cl. ................................. 364/715; 343/5 DP
[58] Field of Search ............ 235/152, 156; 343/5 DP, 343/17.1 R; 328/167

[56] References Cited

U.S. PATENT DOCUMENTS

| | | | |
|---|---|---|---|
| 3,493,874 | 2/1970 | Finkel et al. ........................ | 328/151 |
| 3,614,626 | 10/1971 | Dillard ........................... | 343/5 DP X |
| 3,619,586 | 11/1971 | Hoff, Jr. et al. .................... | 235/156 |
| 3,761,922 | 9/1973 | Evans ............................... | 343/5 DP |
| 4,013,998 | 3/1977 | Bucciarelli et al. .......... | 343/5 DP X |

Primary Examiner—David H. Malzahn
Attorney, Agent, or Firm—R. S. Sciascia; G. J. Rubens; H. Fendelman

[57] ABSTRACT

An apparatus for estimating the mean level of a stochastic process such as would be observed at the output of a radar, communications, or sonar receiver and for using the mean level to provide a threshold with which possible signal samples are compared to determine the presence or absence of the signal. The estimated mean level is used in lieu of a priori information when it is unreasonable to assume that the characteristics of the stochastic process are known. A first order recursive filter receives signal samples and provides an output which is proportional to the mean of the stochastic process. The output of the first order recursive filter $Y_n$ is multiplied by the factor T such that the product $TY_n$ is a threshold quantity which is compared with the input signal samples $X_n$. When $X_n$ exceeds $TY_n$ an output is indicated.

6 Claims, 3 Drawing Figures

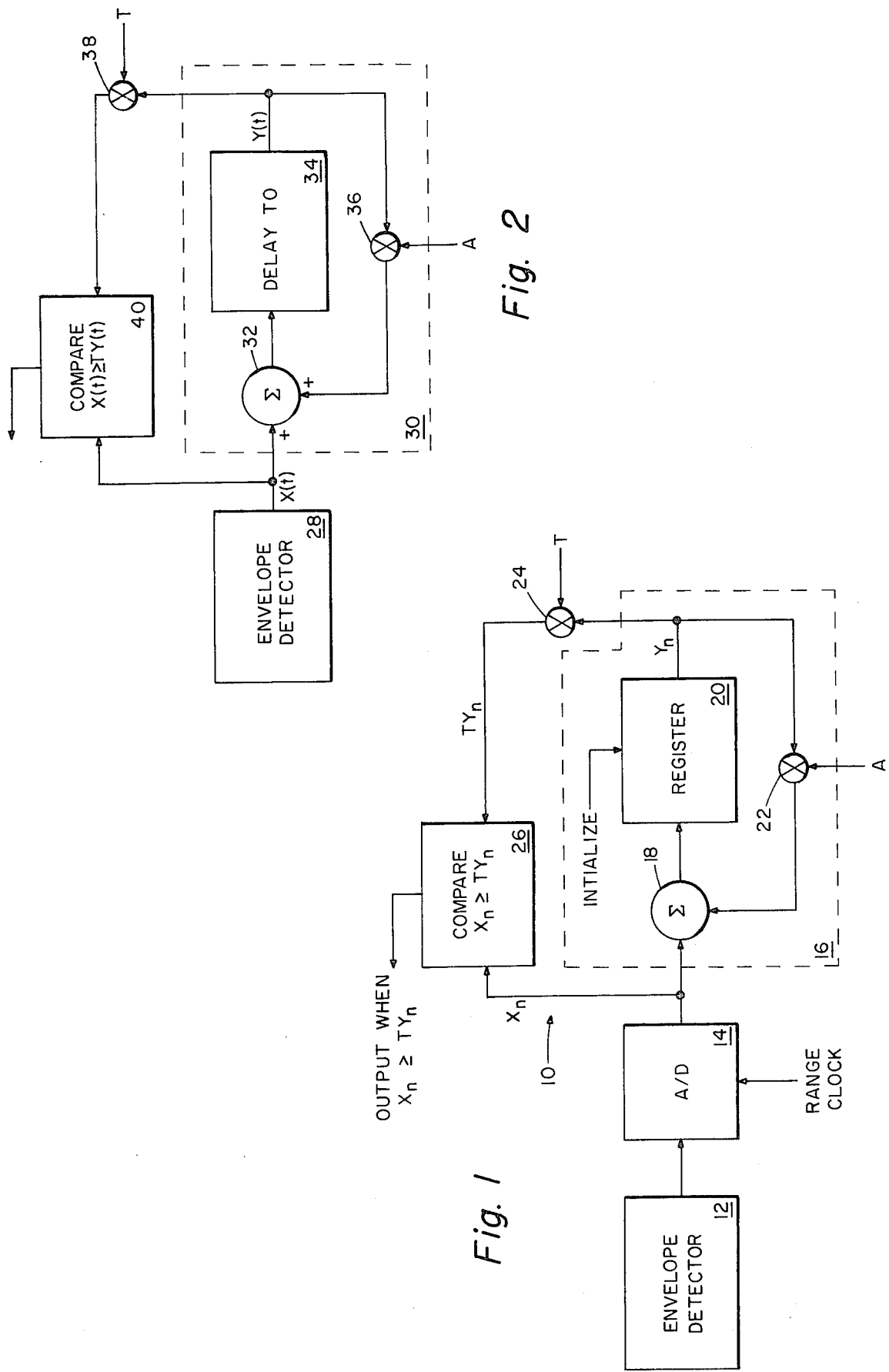

RECURSIVE FILTER MEAN-LEVEL DETECTOR

BACKGROUND OF THE INVENTION

The present invention relates to the field of adaptive or mean level detection of targets in nonstationary clutter. Among these techniques are those which use a detection threshold that is determined from estimates of the mean level of clutter plus noise. The primary objective of mean level techniques is to provide a constant false-alarm rate (CFAR) while maintaining detection probabilities for signals of interest. Other techniques that have been used in the past are: tapped delay lines wherein the waveform presenting the data of interest is delayed and summed in such a fashion as to provide an empirical average of the background and use of a passive or active (non-recursive) electronic filter to provide an estimate of the mean level as well as various nonparametric and distribution-free statisical methods described in the literature. The many CFAR techniques have varying degrees of complexity of implementation and their performance also varies considerably depending on the actual noise and/or clutter background encountered. Because no single system can perform optimally for all possible backgrounds encountered, tradeoffs must be made between systems in terms of complexity, cost, performance in specified backgrounds, etc. For example, the tapped delay line mean level detector requires extremely accurate and broadbandwidth delay lines if implemented with analog circuitry. If implemented with digital circuitry, several digital numbers must be stored and added, thus requiring a large amount of equipment. The passive or active electronic filter must be very accurate and stable and thus can be a problem to implement and maintain. Finally, the distribution-free methods require many computations based on the input data such as ranking according to magnitudes.

SUMMARY OF THE INVENTION

The present invention relates to the use of a simple digital first-order recursive filter for mean level detection. The device of the present invention has the advantage of simplicity, reliability, and ease of implementation. When the background noise is stationary, the use of a first order recursive filter for mean level detection in accordance with the present invention results in performance that is comparable to that which is achieved by conventional tapped delay-line techniques while obviating the necessity of broadbandwidth delay lines.

In accordance with the present invention the mean level of a stochastic process is recursively computed as samples are received. This estimate of the average noise in the process is then multiplied by a predetermined factor to establish a threshold level. This threshold level is then compared with the sample values such that when the sample values are greater than the threshold level an output is indicated.

OBJECTS OF THE INVENTION

It is the primary object of the present invention to disclose a mean level detector and threshold circuit that provides a constant false-alarm rate while maintaining acceptable detection probabilities for signals of interest.

It is another object to the present invention to provide a device for calculating the mean level of a stochastic process that is simply and easily implemented.

Other objects and many of the attendant advantages of this invention will be readily appreciated as the same becomes better understood by reference to the following detailed description when considered in connection with the accompanying drawings.

BRIEF DESCRIPTION OF THE DRAWINGS

FIG. 1 is a block diagram of a digital version of the mean level detector in accordance with the present invention.

FIG. 2 is a block diagram of an analog implementation of the mean level detector of the present invention.

DESCRIPTION OF THE PREFERRED EMBODIMENTS

Figure 3:
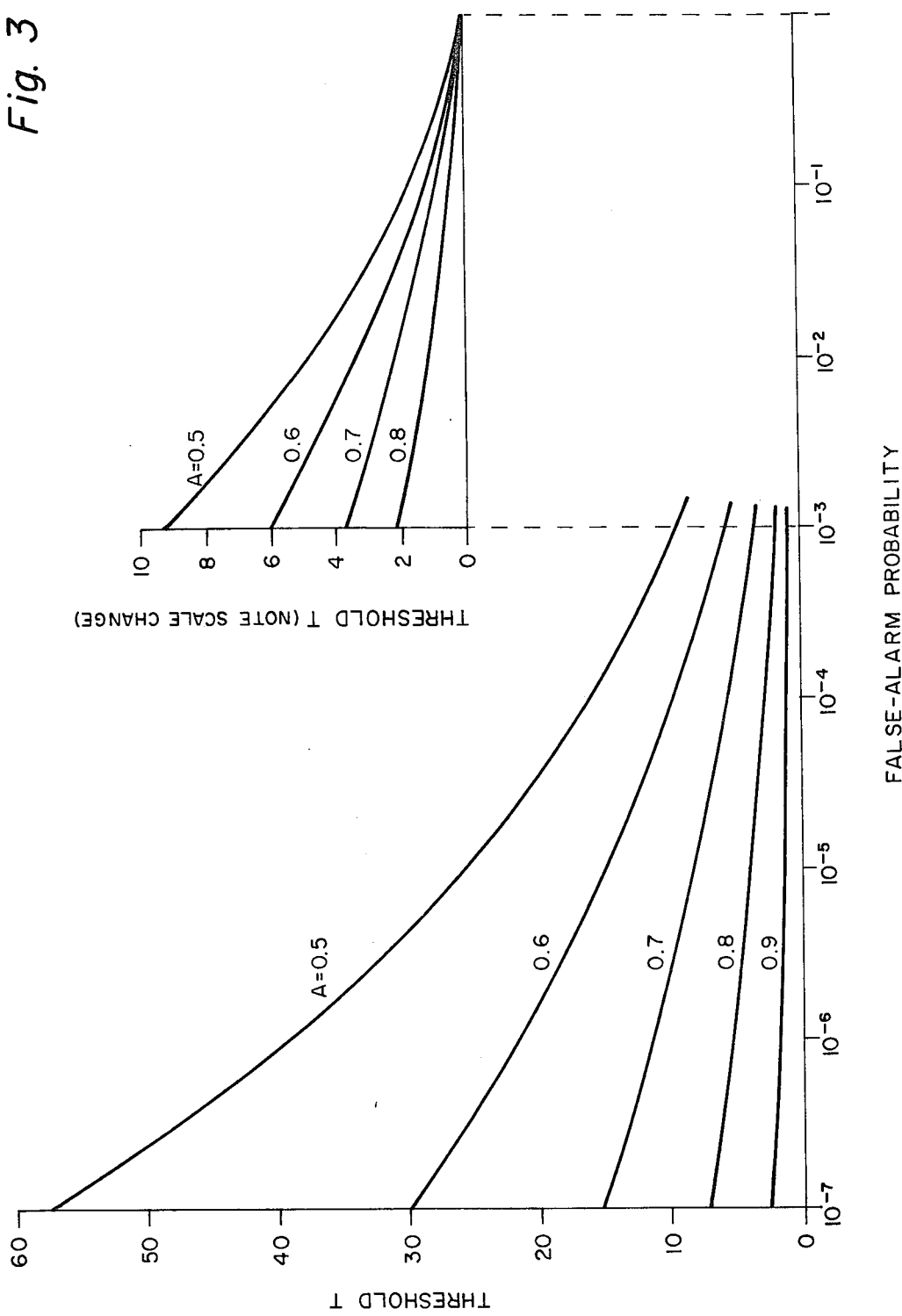
FIG. 3 is a graph illustrating the relationship between the values A, T and $\alpha$ in accordance with the present invention.

FIG. 1 shows a block diagram of the mean level detector 10 of the present invention. The output from an envelope detector 12 which may, for example, form part of a radar, sonar, or communications receiver and which may comprise, for example, a square law detector of the diode type is converted to digital form by the A/D converter 14 at a rate appropriate for the waveform being sampled. This rate is controlled by the input to the A/D converter 14 from the range clock (not shown) which typically samples the detected signals at a rate which is relatively high with respect to the pulse rate of the radar, sonar or communications system and may, for example, occur at the Nyquist rate. The sampled values $X_n$, thus appear at the output of the A/D converter 14.

A first order recursive digital filter 16 is connected to the output of the A/D converter 14. The filter is comprised of a summing circuit 18, a storage register 20 connected to the output of the summing circuit 18 and a multiplier 22 connected in a feedback loop between the register 20 and the summing circuit 18. The storage register 20 is an accumulator and stores a single multibit binary number. The multiplier 22 multiplies the contents, $Y_n$, of the register 20 by the constant A where $0 < A < 1$.

The output of the recursive digital filter 16 is one of the inputs to the multiplier 24 which has as its other input the value T described below. Multiplier 24 thus produces an output, $TY_n$, which forms one of the inputs to the comparator 26. The other input to the comparator 26 is $X_n$ which is derived from the A/D converter 14. The comparator 26 provides an output and, therefore, an indication that a signal is present when the value $X_n$ is greater than or equal to the value $TY_n$.

The detector 10 operates as follows. Each new sample value $X_n$ is added to the previous contents $Y_n$ of the register 20 with $Y_n$ being multiplied by the constant A. Therefore, the output sequence $Y_o, Y_1, \ldots, Y_n, \ldots,$ can be determined from the equation $$Y_n = X_{n-1} + AY_{n-1} \tag{1}$$

where $Y_o$ equals some initial value and $n = 1, 2, \ldots$. The relationship shown in equation (1) can also be written $$Y_n = A^n Y_o + \sum_{K=0}^{n-1} A^K X_{n-K-1}. \tag{2}$$

If it is assumed that the output from the envelope detector 12 is a stationary process with mean M and that the sample values $X_o, X_1, \ldots$, are independent random variables, then the expected or mean value of $Y_n$ is $$E[Y_n] = A^n E(Y_o) + M \sum_{K=0}^{n-1} A^K = A^n E(Y_o) + \frac{M(1-A^n)}{1-A}. \quad (3)$$

Therefore, when N is large, the expected value of $Y_n$ is approximately $M/(1-A)$, which is proportional to the mean of the stochastic process.

The input $X_n$ is compared with the previous estimate of the mean $Y_n$, which has been multiplied by a predetermined value T. If $X_n \geq TY_n$, an output occurs indicating that $X_n$ is an observation from some other random process than was $X_o, X_1, \ldots, X_{n-1}$; i.e., indicating that a signal is present. If the circuit 10 is applied to a noncoherent pulsed radar system, the samples from the A/D converter 14 correspond to range bins. Thus, if $X_n \geq TY_n$, this is an indication that a target is present in the $n^{th}$ range bin.

The mean level circuit 10 can be initialized as appropriate. For the pulsed radar example above, the initialization will occur after each pulse is transmitted. If $Y_0 = 0$, both the false alarm and detection probabilities will be dependent on $n$, i.e. on the range bin in a pulsed radar system application. However, if an appropriate initial value for $Y_0$ is used, this dependence can be essentially removed.

Determination of $Y_0$ will now be discussed. For purposes of this discussion it is understood that the second subscript corresponds to the pulse number which, for a scanning, constant PRF radar is related to the azimuth, and the first subscript corresponds to the sample number.

The initial value $Y_{0m}$ is determined for the sequence $X_{00}, X_{01}, \ldots, X_{0,m-1}$ obtained from the $0^{th}$ range bin on successive pulses. A first order recursive filter identical to the one shown in FIG. 1 (except for the constant A) can be used to compute $$Y_{0m} = \sum_{i=0}^{m-1} B^{m-1-i} X_{0i} \text{ where } m = 1, 2, \ldots, \quad (4)$$

and where $B$ is an input to the multiplier of the filter as is A in FIG. 1. It is noted that the update rate of this filter is equal to the radar PRF, not the A/D conversion rate. Combining equations (4) and (1), the mean level estimate for the $N^{th}$ range bin on the $m^{th}$ pulse is $$Y_{nm} = A^n \sum_{i=0}^{m-1} B^{-i} X_{0,m-1-i} + \sum_{K=0}^{n-1} A^K X_{n-1-k,m}. \quad (5)$$

The gain A ($0 < A < 1$) determines the response time of the filter 16 and the value T determines the false alarm rate. For the pulsed radar application, if the output from the comparator 26 of FIG. 1 is sampled at the same rate that the samples $X_n$ are obtained, each sample corresponds to a particular range bin. The output from each range bin can then be input to a binary integrator (K of M detector) and integrated over the antenna dwell time. Such an integration procedure is described in "Mean-level Detection of Non Fluctuating Signals," IEEE Transaction on Aerospace and Electronics Systems, VOL. AES-10, pp. 795-799 November 1974 by G. M. Dillard.

The asymptotic value of the false alarm probability $\alpha$ is given by $$\alpha = \pi_{K=0}^{\infty} [1 + A^K T]^{-1} \quad (6)$$

The value T is determined from equation (6) by stipulating a desired or design false alarm probability $\alpha$ and solving numerically for T in terms of A and $\alpha$. This relationship is illustrated in the graph of FIG. 3.

FIG. 2 shows the implementation of the mean level detector of the present invention using analog circuitry. The envelope detector 28 operates in the same fashion as envelope detector 12 of FIG. 1. The output $X(t)$ of envelope detector 28 is the input to recursive filter 30 which is comprised of the summing circuit 32, the delay circuit 34 and the feedback multiplier 36. The $T_0$ of the delay circuit 34 is determined by the bandwidth of the input process. For example, $T_0$ may be the reciprocal of the sampling rate for the A/D converter 14 of FIG. 1. The waveform $Y(t)$ at the output of the recursive filter 30 is multiplied (attenuated) by the factor A and is added to the input waveform $X(t)$ to estimate the mean level in the same manner as described above for the digital mean level detector 10. Similarly, $Y(t)$ is multiplied by multiplier 38 with the factor T. $X(t)$ is then compared with $TY(t)$ and comparator 40 provides an output indicating the presence of a signal when the condition $X(t) \geq TY(t)$ occurs. As an alternative, an analog sampler such as a sample-and-hold circuit may be placed prior to the summing device 32 so that each input is a constant analog voltage $X(t_n)$ instead of the possibly timed-varying waveform $X(t)$.

It is also to be understood that hybrid analog/digital techniques can also be used, such as charge coupled devices (CCD's). For example, the delay of delay device 34 could be implemented using a CCD register and the multiplication by the constant A or T can be effected by split-electrode techniques applied to CCD's.

Obviously many modifications and variations of the present invention are possible in the light of the above teachings. It is therefore to be understood that within the scope of the appended claims the invention may be practiced otherwise than as specifically described.

What is claimed is:

1. A device for calculating the mean level of a stochastic process and for using the mean level to provide a threshold for determining the presence or absence of a signal comprising:

first means for outputting sample values $X_n$ of a detected signal;

a first order recursive filter connected to the output of said first means for providing output values $Y_n$ proportional to the mean value of said stochastic process;

second means connected to said first order recursive filter for forming the products $TY_n$ where T is a predetermined value; and third means for comparing the values $TY_n$ with said values $X_n$ and for providing an output when $X_n \geq TY_n$.

2. The device of claim 1 wherein said first order recursive filter comprises:

a summing circuit;

a storage register connected to the output of said summing circuit; and a multiplier connected to said storage register and to said summing circuit.

3. The device of claim 2 wherein said first means comprises:
- an envelope detector; and
- an analogue-to-digital converter connected to the output of said envelope detector.

4. The device of claim 3 where $T > 1$.

5. A device for calculating the mean level of a stochastic process and for using the mean level to provide a threshold for determining the presence or absence of a signal comprising:
- first means for outputting a waveform $X(t)$ representing a detected signal;
- a first order recursive filter connected to the output of said first means for providing an output waveform $Y(t)$ delayed from $X(t)$ by a time delay $T_o$ and representing an estimate of the mean level of said stochastic process;
- second means connected to said first order recursive filter for forming the product $TY(t)$ where $T$ is a predetermined value; and
- third means for comparing $X(t)$ with $TY(t)$ and for providing an output when $X(t) \geq Y(t)$.

6. The device of claim 5 wherein said first order recursive filter comprises:
- a summing circuit;
- a delay circuit connected to the output of said summing circuit; and
- a multiplier connected between said delay circuit and said summing circuit.

* * * * *